United States Patent [19]

Planteline

[11] Patent Number: 4,855,901
[45] Date of Patent: Aug. 8, 1989

[54] APPARATUS FOR TRANSFERRING DATA BETWEEN A MICROPROCESSOR AND A MEMORY

[75] Inventor: Pierre Planteline, Eybens, France
[73] Assignee: Bull, S.A., Paris, France
[21] Appl. No.: 893,931
[22] Filed: Aug. 6, 1986
[30] Foreign Application Priority Data
Aug. 6, 1985 [FR] France ............... 85 12000
[51] Int. Cl.$^4$ ........................... G06F 13/14
[52] U.S. Cl. ................. 364/200; 364/258.4; 364/240.9; 364/264.6
[58] Field of Search ... 364/200 MS File, 900 MS File
[56] References Cited

U.S. PATENT DOCUMENTS

| | | | |
|---|---|---|---|
| 4,017,840 | 4/1977 | Schild et al. | 364/200 |
| 4,050,097 | 9/1977 | Miu et al. | 364/200 |
| 4,149,239 | 4/1979 | Jenkins et al. | 364/200 |
| 4,464,715 | 8/1984 | Stamm | 364/200 |

OTHER PUBLICATIONS

"Input/Output Control Unit Busy Disconnect Mechanism"; M. J. Mitchell, Jr.; *IBM Technical Disclosure Bulletin;* vol. 19, No. 8, Jan. 1977; pp. 2999-3002.
"The 68000 and its Interface", *Microprocessors and Microsystems,* vol. 8, No. 7, Sep. 1983, pp. 324-337, Butterworth & Co. (Pub.) Ltd.

*Primary Examiner*—Thomas M. Heckler
*Assistant Examiner*—Christina M. Eakman
*Attorney, Agent, or Firm*—Lowe, Price, LeBlanc, Becker & Shur

[57] ABSTRACT

Data are asynchronously transferred between a microprocessor and a dynamic memory under the control of a memory controller and a circuit for deriving an internal acknowledgment signal. The internal acknowledgment signal is derived in response to the memory controller deriving a signal indicating that the memory is unavailable at the time a transfer request is derived by the microprocessor or in response to a transfer request derived by the microprocessor. A mask signal is generated in response to the transfer request, a clock signal and a previously derived value for the mask signal. The mask signal has a duration to guarantee a minimum data transfer time between the memory and the microprocessor compatible with the access time T of the memory. The mask signal is combined with the internal acknowledgment signal to control the microprocessor supplying signals to the memory.

14 Claims, 6 Drawing Sheets

APPARATUS FOR TRANSFERRING DATA BETWEEN A MICROPROCESSOR AND A MEMORY

TECHNICAL FIELD

The present invention relates generally to a method of and apparatus for transferring data between a microprocessor and a memory and more particularly to a memory controller method and apparatus wherein an internal acknowledgment signal for the microprocessor is derived when (1) the memory is unavailable while the microprocessor requests a transfer or (2) the microprocessor derives a synchronized transfer request when unused memory space is allocated to the microprocessor, and wherein the acknowledgment signal is masked in response to a signal that is derived in response to the transfer request to guarantee a minimum transfer time compatible with access time of the memory.

BACKGROUND ART

In one prior method of and apparatus for asynchronously transferring data between a microprocessor and a memory an acknowledgment signal for the microprocessor is generated by a memory controller. The acknowledgment signal provides the microprocessor with an indication that it is to be responsive to data on a data bus connecting the microprocessor to the memory. In general, the data are coupled to the bus at a time T subsequent to the microprocessor deriving a transfer request signal AS which is coupled to the memory via the controller; the controller responds to the transfer request signal to enable the memory to be addressed by the microprocessor which derived the transfer request signal if all other conditions have been satisfied; e.g. the memory is not performing read or write operations for another microprocessor or a terminal. Such memory controllers are constructed to deliver an acknowledgment signal during a time period $t_4$ (FIG. 4) which occurs prior to coupling of the data to the bus; for a Motorola 68010 microprocessor having a clock frequency of 10 MHz, the acknowledgment signal must be derived at least 65 nanoseconds before the data is coupled to the bus, if the acknowledgment signal is asynchronous relative to a clock source of the microprocessor.

In order for the acknowledgment signal to be accepted by the microprocessor, the acknowledgment signal must be coupled to the microprocessor at least 20 nanoseconds before the trailing edge of a clock pulse is coupled to the microprocessor. The microprocessor can respond accurately to the data coupled to it by the bus only if the data are coupled to the microprocessor on the data bus at least 15 nanoseconds ($t_m$, FIG. 4) before the trailing edge of a clock pulse is coupled to the microprocessor. If the microprocessor and memory operate asynchronously, this set of time constraints causes, in most cases, coupling of the data to the microprocessor only after an additional waiting cycle of the microprocessor clock has elapsed, as represented in FIG. 4.

DISCLOSURE OF INVENTION

It is, accordingly, an object of the present invention to provide a new and improved method of and apparatus for eliminating additional waiting microprocessor clock cycles which increase the transfer time between a memory and microprocessor.

The aforementioned object is achieved by asynchronously transferring data between a microprocessor and a dynamic memory controlled by a memory controller by deriving an internal acknowledgment signal in response to a signal which is derived when the memory is unavailable at the time a transfer request is derived by the microprocessor or in response to derivation of an advance acknowledgment signal which is asynchronous with the transfer request derived by the microprocessor when unused memory space is allocated to the microprocessor. In addition, the acknowledgment signal supplied to the microprocessor is masked in response to derivation of an advance acknowledgment signal, thereby to guarantee a minimum transfer time between the microprocessor and memory, which transfer time is compatible with memory access time T.

The apparatus for performing the method includes a circuit for generating an acknowledgment signal in response to a transfer request signal derived by the microprocessor. A circuit generates masking signal F in response to the transfer request derived by the microprocessor and a pair of synchronously related clock signals. The masking signal is supplied to a NAND gate, also responsive to the internal acknowledgment signal.

According to another aspect of the invention, a NAND gate enables the internal acknowledgment signal to be coupled to the microprocessor in response to a memory controller indicating that the memory is allocated to the microprocessor.

In accordance with still another aspect of the invention, the circuit for deriving the internal acknowledgment signal includes a NAND gate responsive to a signal (derived by the memory controller) which indicates that the memory is not available at the time a transfer request is derived. The NAND gate is also responsive to an advance acknowledge signal derived by D-type flip-flop, having a clock input responsive to an inverted transfer request signal derived by the microprocessor. A second input of the D-type flip-flop is responsive to a signal derived by the memory controller to indicate that the memory is functioning. The D-type flip-flop includes a set input responsive to an output signal of an AND gate. The AND gate responds to a signal derived by the controller to indicate that the memory is idle, as well as a signal indicating that reinitialization has occurred; the signal indicative of reinitialization having occurred is derived in response to a power supply for the system being energized or deenergized.

Still a further object of the invention is to provide a new and improved apparatus for performing the method in connection with a dynamic memory module operating with anticipatory staging.

Another object of the invention is to provide a new and improved apparatus for and method of operating a dynamic memory with anticipatory staging through the use of a memory control unit which does not process low-order bits used by a line address strobe of dynamic memory units.

The foregoing object is achieved by employing a NAND gate for enabling transmission of the acknowledge signal to the microprocessor in response to derivation of a signal by the controller to indicate that the memory module has self-decoded.

Yet another object of the invention is to provide a new and improved apparatus for transferring data between a microprocessor and a static read-write memory or a read-only memory.

The foregoing object is achieved by employing a generating circuit including a NAND gate responsive to an acknowledgment signal derived by the memory controller. The acknowledgment signal is derived when one part of the memory is unavailable. The NAND gate is also responsive to an advance acknowledgment signal derived by the output of the D flip-flop, having a clock input responsive to the inverted transfer request signal derived by the microprocessor. The D flip-flop has a data (D) input responsive to a signal derived by the memory controller indicating that the memory is working. The D flip-flop has a set input responsive to a signal derived by the output of an AND gate. The NAND gate derives a signal which enables transmission of the acknowledgment signal to the microprocessor. The NAND gate is also responsive to a signal derived by the controller to indicate that the memory module has self-decoded. The AND gate responds to a signal derived by the controller to indicate that a memory cycle external to the microprocessor is being performed. The circuit includes a further NAND gate having one input responsive to the transfer request signal derived by the microprocessor and a second input responsive to an output of the D flip-flop.

The above and still further objects, features and advantages of the present invention will become apparent upon consideration of the following detailed description of several specific embodiments thereof, especially when taken in conjunction with the accompanying drawings.

BEST MODE FOR CARRYING OUT THE INVENTION

Figure 1:
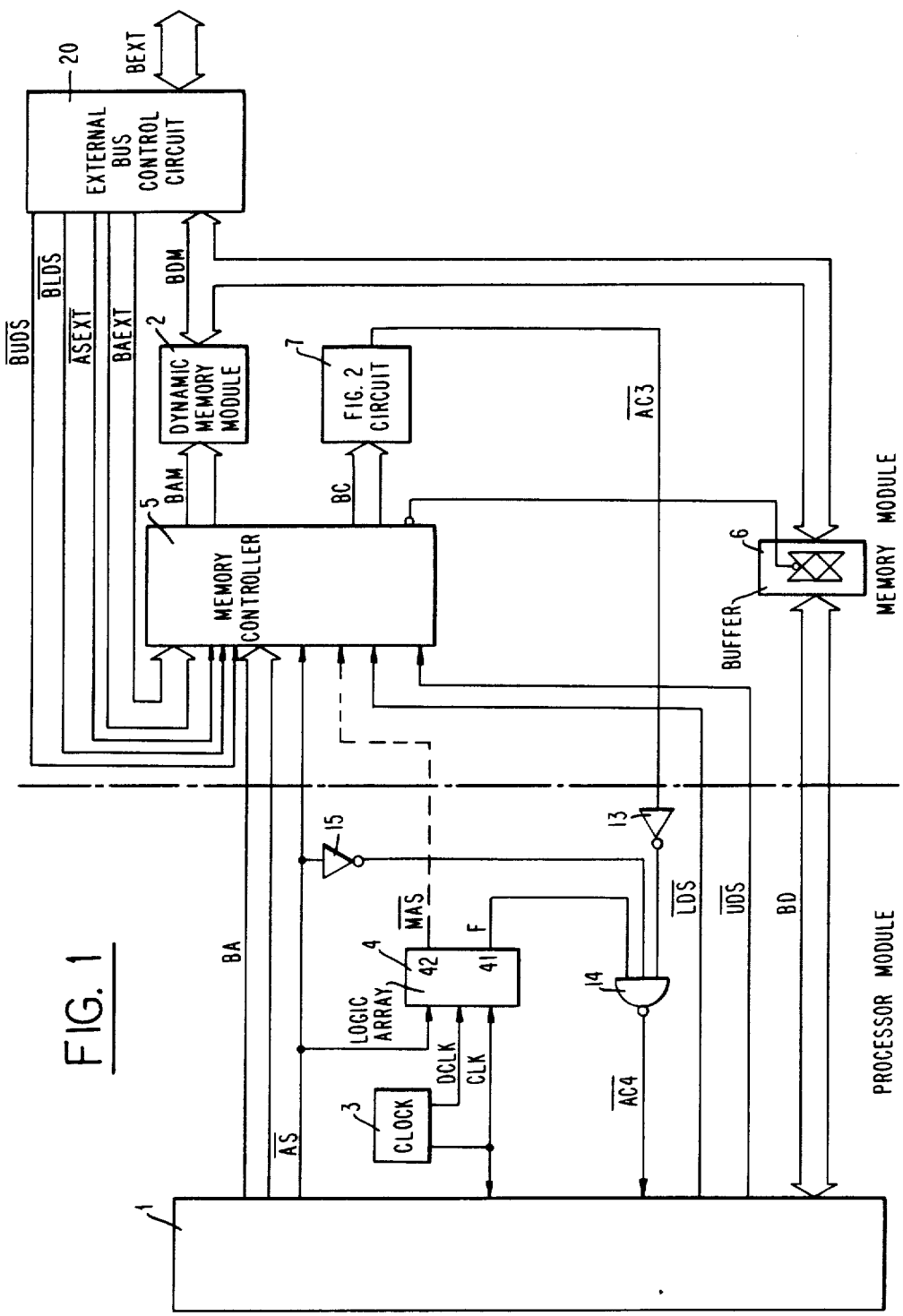
FIG. 1 is a schematic diagram of a system including a preferred embodiment of the present invention.

FIG. 1 is a block diagram of the invention that generally includes a processing module, to the left of the vertical dashed line, and a memory module, generally to the right of the vertical dashed line. The processing module includes microprocessor 1, such as a Motorola 68010 microprocessor. Memory module 2 includes, in the illustrated embodiment, dynamic memory module 2, as well as logic circuitry associated therewith. Dynamic memory module 2 is coupled by data buses BDM and BD, address bus BAM and signal lines to the processing module including microprocessor 1 and to other modules, e.g. other microprocessors and/or other devices, e.g., a terminal; the signals from the other modules are coupled to the memory module via external bus BEXT. Memory 2 thus stores data for microprocessor 1 and the other devices; it can only be accessed by one of the devices at a time.

The processing module includes clock circuit 3 for deriving clock signals CLK and DCLK, the latter having a frequency that is twice the frequency of the former, such that signals CLK and DCLK have simultaneous trailing edge transitions. Clock signal CLK is coupled from clock source 3 to a clock input of microprocessor 1. Microprocessor 1 has data terminals coupled with data terminals of dynamic memory module 2 by data bus BD by way of intermediate buffer circuit 6, that is coupled directly to a data input of module 2 by memory data bus BDM.

Microprocessor 1 includes address output terminals coupled to address bus BA, connected to memory controller 5 in the memory module. Memory controller 5 is a known prior art circuit, and therefore need not be illustrated; it includes circuitry for accessing memory 2 in response to signals from the processor module including microprocessor 1 as well as from devices coupled to the memory module via external bus BEXT. Controller 5 responds to signals coupled to it to supply address signals to memory 2 via bus BAM. Memory controller 5 also includes an output control bus BC having several leads on which are derived control signals in response to input signals for the controller. When memory 2 is accessed by external bus BEXT, the signals are coupled via conventional interface circuit 20, which supplies address signals on external bus BEXT to the controller via external address bus BAEXT. Memory controller 5 is energized in a known manner so that the address signal on bus BA or bus BAEXT is selectively coupled to address input bus BAM of memory 2. Interface 20 also couples data signals between memory 2 and external bus BEXT via memory data bus BDM by known circuitry.

Microprocessor 1, in addition to deriving address and data signals on address bus BA and on data bus BD, derives certain command signals. The specific command signals derived by microprocessor 1 which are utilized 5 in the present invention are designated as $\overline{AS}$, $\overline{LDS}$ and $\overline{UDS}$. Microprocessor 1 derives signal $\overline{AS}$ to indicate that it is requesting a transfer of data between itself and memory 2. Signal $\overline{AS}$ is combined with signals CLK and DCLK, derived from clock source 3, in logic array 4 that is programmed using known Boolean algebra techniques and obvious circuitry to derive two output s signals $\overline{MAS}$ and F.

Signal $\overline{MAS}$ is derived in accordance with:

$$MAS = (AS) \cdot (CLK) + (MAS) \cdot (\overline{(AS)} \ \overline{(CLK)}).$$

Figure 6:
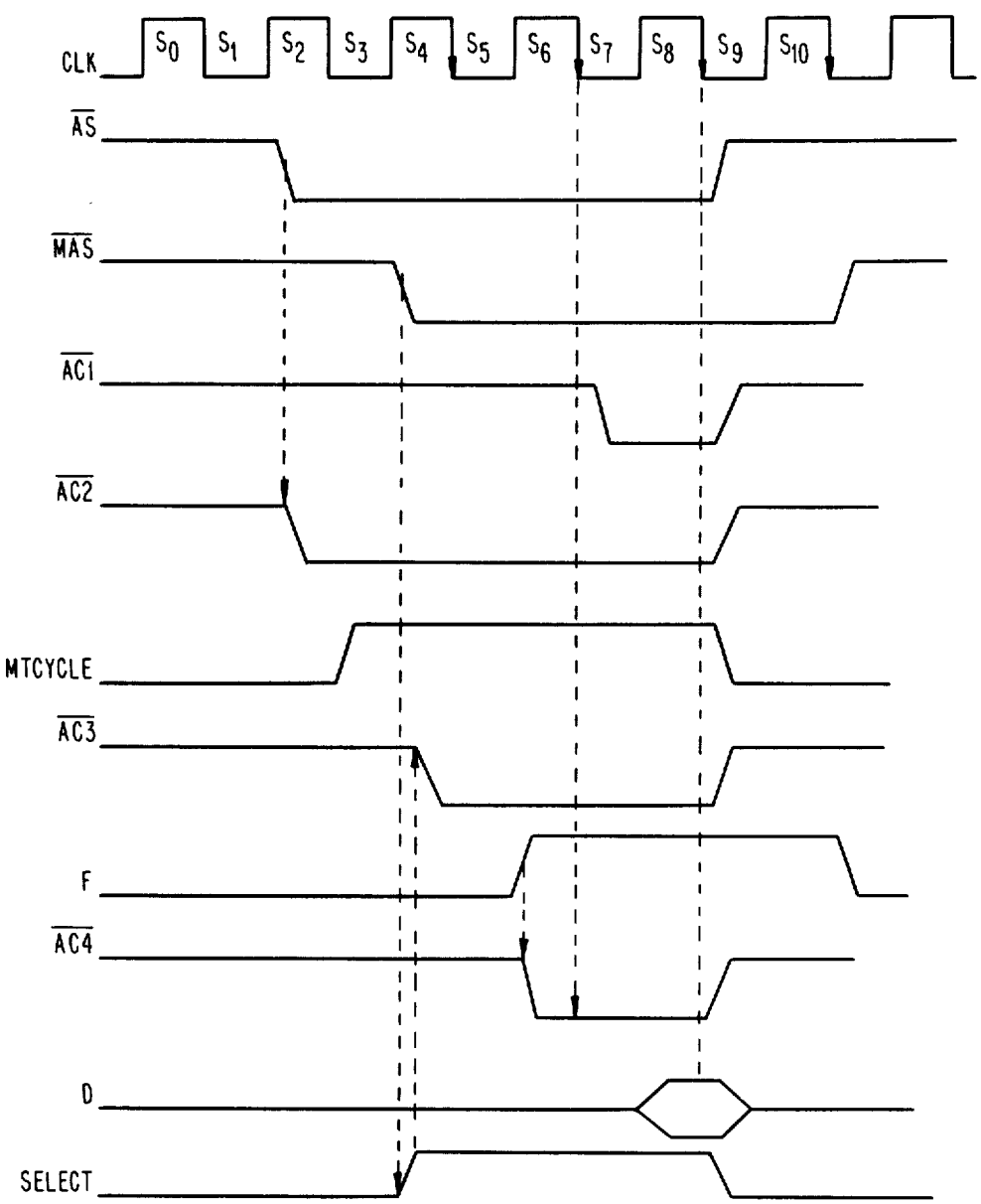
FIG. 6 is a series of waveforms indicating the nature of the signals derived by the apparatus of FIGS. 1 and 2 when the method of the invention is performed during a read cycle of a dynamic memory operating with anticipatory staging.

Thus, signal MAS is a function of the previous value of MAS, and the transfer request signal ($\overline{AS}$) derived from microprocessor 1. Signal $\overline{MAS}$ is clocked in response to signal CLK derived from source 3. Signal MAS has leading edge transitions responsive to transitions of the transfer request output signal $\overline{AS}$ of microprocessor 1, as illustrated in FIG. 6. The second output signal F of logic array network 4 changes level in response to the first positive going transitions of clock signal CLK following derivation of signal MAS. Signal F is computed by logic array 4 in accordance with:

$$F = (MAS) \cdot \overline{(CLK)} + F(\overline{(AS)} \cdot \overline{(CLK)}).$$

Signal F thus has a duration commensurate with the time required to transfer data between microprocessor 1 and memory 2 equal to the transfer time of one waiting cycle of the memory for command signals from the microprocessor.

Circuit 20 responds to signals on external bus BEXT to derive output signals $\overline{BLDS}$ and $\overline{BUDS}$, respectively representing low and high order data enabling being indicated for the signal on bus BEXT. Microprocessor 1 derives similar signals $\overline{LDS}$ and $\overline{UDS}$ to indicate low and high order data enabling at the output of microprocessor 1. Signals $\overline{UDS}$, $\overline{BUDS}$, $\overline{LDS}$ and $\overline{BCDS}$ are coupled to several memory modules so that the high order signals control which memory module is selected and the low order signals control which address in the selected module undergoes a read or write operation. Each module includes a memory and memory controller similar to memory 2 and controller 5. Each memory controller responds to the high and low order signals in a known manner to control its associated memory. In general the following description is limited to the illustrated memory 2, controller 5 and the circuitry of the illustrated module. However, it is to be understood that the remaining memory modules function in the same manner described for the illustrated module.

Memory controller 5 selectively responds to the address signals on address buses BA and BAEXT, respectively derived from microprocessor 1 and interface 20. Memory controller 5 responds to command signals supplied to it to couple the signal on one of address bus BA or external address bus BAEXT to the address input of memory 2 via memory address bus BAM.

Memory controller 5 also responds to command signals derived by microprocessor 1 and the external bus processing circuit 20 to control derivation of the signals on control bus BC in a known manner through the use of known circuitry. The command signals for controller 5 are: (1) the transfer request signals AS and ASEXT respectively derived by microprocessor 1 and on external bus control circuit 20, (2) the high and low order data enabling signals $\overline{UDS}$, $\overline{LDS}$, $\overline{BUDS}$, and $\overline{BLDS}$, derived from microprocessor 1 and external bus control circuit 20, and (3) the $\overline{MAS}$ output signal of logic array 4. The memory controller 5 responds to the command input signals thereof to derive a control signal for intermediate buffer 6, as well as various signals that are supplied via control bus BC to circuit 7, illustrated in FIGS. 2, 7 and 8 for various embodiments of the invention. Circuit 7 responds to the signals on control bus BC to derive internal acknowledgment signal $\overline{AC3}$, which enables microprocessor 1 to be signalled that memory 2 has acknowledged the address which the microprocessor has derived on address bus BA and that the transfer request signalled by signal $\overline{AS}$ has occurred. Memory controller 5 is also responsive in a conventional way to a signal which requests that memory 2 be refreshed (the refresh signal is not illustrated in FIG. 1).

The $\overline{AC3}$ internal acknowledgment output signal of circuit 7 is combined in a logic network that is part of the processor module including microprocessor 1. The logic network is also responsive to the F output signal of logic array 4 and to the transfer request signal AS derived from microprocessor 1. The logic network responsive to signals $\overline{AC3}$, $\overline{AS}$ and F includes inverters 13 and 15 and NAND gate 14, which derives acknowledgment signal $\overline{AC4}$. Signal $\overline{AC4}$ is coupled to a control input terminal of microprocessor 1 which enables circuits in the microprocessor to be coupled to the data and address terminals of the microprocessor.

The selection logic for controlling access to memory 2 is included in controller 5. This selection logic has not been illustrated because it is known and not essential for an understanding the present invention.

Internal acknowledgment signal $\overline{AC3}$, derived by circuit 7, is coupled to inverter 13, having an output connected to one input of three input NAND gate 14. A second input of NAND gate 14 is responsive to the output of inverter 15, having an input responsive to the AS transfer request output signal of microprocessor 1. A third input of NAND gate 14 responds to mask window signal F, derived at output terminal 41 of logic array 4. NAND gate 14 thus derives acknowledgment signal $\overline{AC4}$ in accordance with the Boolean function $\overline{(F) \cdot (AS) \cdot (AC3)}$.

Figure 3:
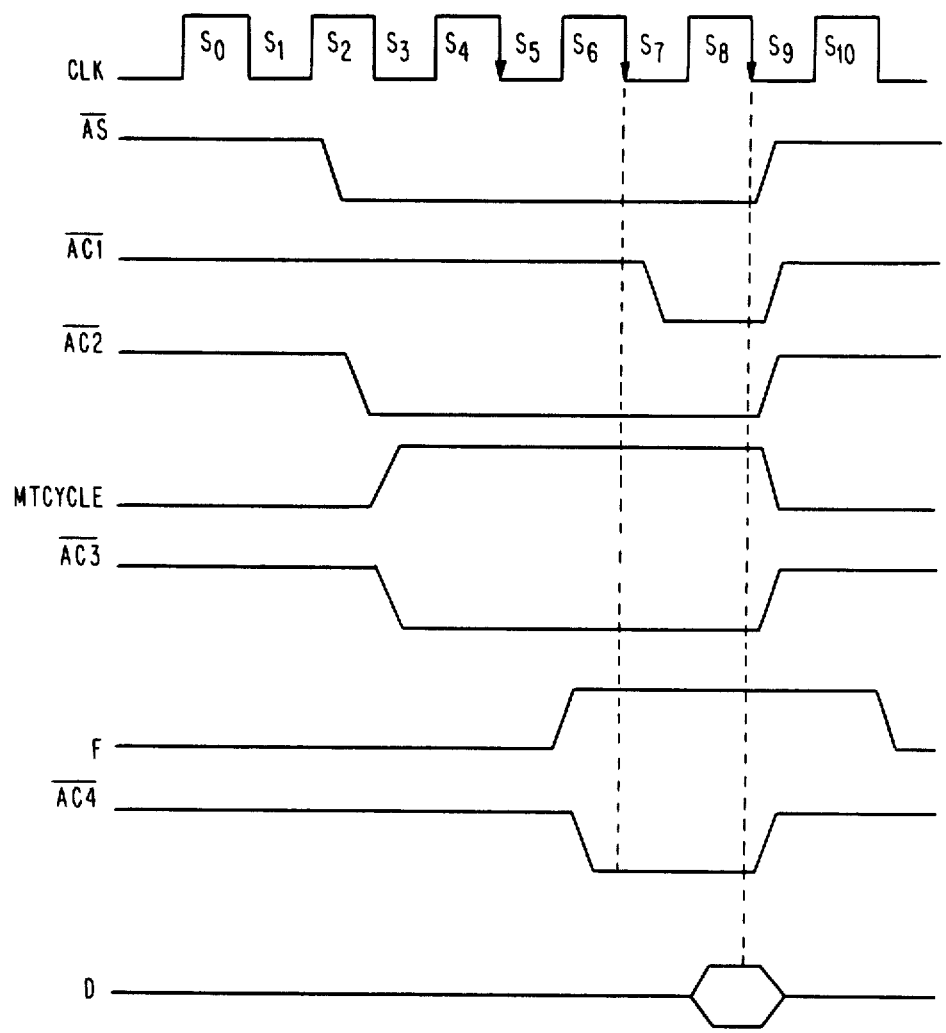
FIG. 3 is a series of waveforms indicating the nature of signals derived by the apparatus of FIGS. 1 and 2 when the method of the invention is performed during a read cycle.

Signal F, calculated as indicated causes memory 2 to have a transfer time corresponding to one waiting cycle of clock signal CLK. If signal F were not used, memory 2 would be required to derive an acknowledgment signal, designated as $\overline{AC2'}$, within a clock period corresponding to phases S5–S6 (FIG. 3). The acknowledgment signal $\overline{AC2'}$, which would be required to be derived by the memory module, would be derived only when memory 2 was available at the time of a transfer request indicated by signal $\overline{AS}$. This would be necessary to insure that the data transfer from microprocessor 1 to memory 2 would occur within one waiting cycle of clock signal CLK, no more, no less. It is necessary for the data transfer to occur in no more than one clock signal waiting cycle to avoid an unnecessary increase in transfer time. The transfer must occur in no less than one waiting cycle because at least one waiting cycle is required to permit the transfer to occur correctly.

It is more difficult for the memory module to derive the acknowledgment signal $\overline{AC2'}$ than for the processing module to derive mask window signal F. However, it appears that derivation by the memory module of such an acknowledgment signal $\overline{AC2'}$ is equivalent to the apparatus wherein signals $\overline{AC2}$ and F are derived. (As described infra in connection with memory controller 5 and circuit 7, signal $\overline{AC2}$ is derived by the memory controller.) The memory module must be able to derive signal $\overline{AC2'}$ during a relatively narrow time interval, i.e., during a "window". The narrow width of the window during which the memory module derives signal $\overline{AC2}$ is a constraint in the operation of the system, because of the dispersion associated with the signal propagation times of typical logic boards, i.e., the spread of signal propagation times between different logic boards.

The width of the window during which the memory module must derive signal $\overline{AC2}$ is expressed as follows:

$$TCLK - [\Delta(\overline{AS})MT + \Delta(\overline{AC3})MT + \Delta(\overline{AC3})MM + 2tpdBUS] - Th(\overline{AC4}) + TSU(\overline{AC4})$$

where:

TCLK is the period of the microprocessor clock signal CLK, $\Delta(\overline{AS})MT$ is the maximum time dispersion of the transfer request signal $\overline{AS}$ derived by microprocessor 1, $\Delta(\overline{AC3})MM$ is the maximum dispersion of the internal acknowledgment signal $\overline{AC2}$ derived by circuit 7 relative to the timing of the transfer request signal $\overline{AS}$ derived by microprocessor 1, $\Delta(\overline{AC3})MT$ is the receiving time dispersion of signal $\overline{AC3}$ by microprocessor 1, i.e., the maximum possible deviation in time that signal $\overline{AC3}$ can be coupled by the memory module t the processing module, which can be expressed as the elapsed time dispersion between the receipt by the processing module of signal $\overline{AC3}$ from the memory module relative to the time that the acknowledge signal $\overline{AC4}$ is coupled to microprocessor 1, Tpd BUS is the maximum propagation time of signal $\overline{AS}$ from the processing module to the memory module and of signal $\overline{AC3}$ from the memory module to the processing module, Th($\overline{AC4}$) is the interval during which signal $\overline{AC4}$ can be recognized by microprocessor 1 after a trail edge of clock signal CLK has been supplied by source 3 to microprocessor 1 (time Th($\overline{AC4}$) is estimated as 20 nanoseconds for a 68010 Motorola microprocessor operating at 10 MHz. If time Th($\overline{AC4}$) were clearly indicated by the microprocessor manufacturer, the time would correspond to the minimum interval during which the microprocessor could respond to acknowledgment signal $\overline{AC4}$); and Tsu($\overline{AC4}$) is a minimum time that microprocessor 1 can respond to and store signal $\overline{AC4}$ relative to the trailing edge of clock signal CLK.

In general, the width of the window has a negative value, signifying that the solution cannot be obtained without making additional adjustments. By utilizing mask signal F, the problem of making additional adjustments due to the negative value of the window width is resolved. To make the window width positive, faster components are employed which generally results in the adverse effect of the system being more likely triggered by noise. The dispersion time for supplying signal $\overline{AC3}$ from the memory module to the processing module and/or the dispersion time of the processing module receiving the $\overline{AC3}$ signal from the memory module can be reduced by providing the memory module and/or the processing module with adjustment controls. In the most difficult cases, it may be necessary to make the memory module and processing module adjustments interdependent. Such interdependence of the processing and memory modules is tantamount to matching the modules, a solution that is inappropriate for industrial applications.

To enable the memory module to derive acknowledgment signal $\overline{AC3}$ during one period of clock signal CLK requires a specific analog adjustment or plural analog adjustments in the memory module. In contrast, control over the derivation times of advance acknowledgment signal $\overline{AC2}$ and mask signal F requires only a non-specific predetermined digital adjustment of the processing module.

Figure 2:
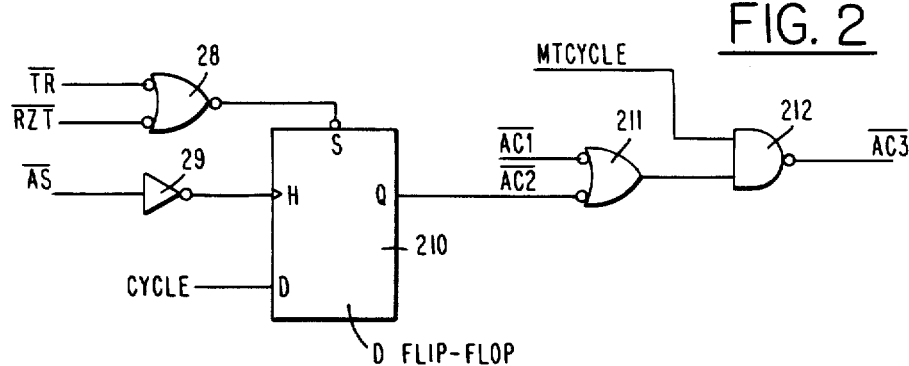
FIG. 2 is a schematic diagram of an acknowledgment signal generating circuit employed in the system of FIG. 1.

FIG. 2 is a schematic diagram of one embodiment of circuit 7 for generating internal acknowledgment signal $\overline{AC3}$. Circuit 7, as illustrated in FIG. 2, includes two input AND gate 28, responsive to a signals ($\overline{TR}$) and $\overline{RZT}$, respectively indicating that the memory module is in an idle period, and that the memory module has been initialized. When memory 2 is idle it can be energized to have data written into and read from it; if the memory is not idle, i.e., is active, it cannot be accessed and the system must wait until the memory again becomes idle before accessing the memory. Signal $\overline{RZT}$ is a machine initialization signal derived by controller 5 in response to a power supply (not shown) for the system of FIG. 1 being activated into an on and/or off condition. Signal $\overline{RZT}$ is maintained at a low level for a minimum of 20 milliseconds; it initializes all of the modules in the system of FIG. 1. AND gate 28 derives an output signal that is DC coupled to set input S of D-type flip-flop 210. Flip-flop 210 has a clock input H responsive to the output signal of inverter 29, having an input responsive to the transfer request output signal $\overline{AS}$ of microprocessor 1. Flip-flop 210 also includes a data (D) input responsive to a signal designated CYCLE, derived by memory controller 5 to indicate that memory 2 is performing a read or write operation.

Flip-flop 210 includes a Q output coupled to an input of NAND gate 211, having a second input responsive to output signal $\overline{AC1}$ which is derived by controller 5 to indicate that memory 2 is not available to receive read or write commands. NAND gate 211 has an output connected to one input of NAND gate 212, having a second input responsive to a signal designated MTCYCLE, derived by memory controller 5 to indicate memory 2 is performing a read or write operation for the processing module including microprocessor 1. Thus, circuit 7 is responsive to output signals $\overline{TR}$, $\overline{RZT}$, CYLE, $\overline{AC1}$, and MTCYCLE, which are coupled to circuit 7 by memory controller 5 on control bus BC.

Signal $\overline{AC3}$, at the output of NAND gate 212, is the internal acknowledgment signal derived by the memory module and supplied by it to the processing module. Internal acknowledgment signal $\overline{AC3}$ is derived in response to derivation of signal $\overline{AC1}$ or $\overline{AC2}$. Signal AC1 is a conventional acknowledgment signal normally derived by memory controller 5 in such a way that when the memory module and the processing module operate asynchronously there is a minimum time allotted by microprocessor 1 from the moment the microprocessor receives acknowledgment signal $\overline{AC4}$ to the instant when the microprocessor supplies data to data bus BD. In contrast, advance acknowledgment signal $\overline{AC2}$ is derived by circuit 7 only if memory 2 is available when the processing module including microprocessor 1 derives transfer request signal $\overline{AS}$, and if a selector of memory controller 5 has allocated space in memory 2 for the processing module.

Signals $\overline{AC1}$ and $\overline{AC2}$ respectively indicative of memory 2 not being available at the time a transfer request is indicated by the $\overline{AS}$ output signal of microprocessor 1, and an advance acknowledgment signal being synchronized with the $\overline{AS}$ output of the microprocessor, are enabled through NAND gate 212 in response to signal MTCYCLE, derived by memory controller 5. Memory controller 5 derives signal MTCYCLE while memory 2 is performing a cycle for the processing module.

Advance acknowledgment signal $\overline{AC2}$ is derived at the Q output of D flip-flop 210 in synchronism with the derivation of transfer request output signal $\overline{AS}$ of microprocessor 1 when memory 2 has unused space allocated to microprocessor 1. D flip-flop 210 derives output signal AC2 in response to the transfer request output signal $\overline{AS}$ of microprocessor 1 being supplied to the clock input H of the flip-flop by way of inverter 29. The D input of flip-flop 210 responds to output signal CYCLE which is derived by memory controller 5 each time that memory 2 is in use. The set input S of flip-flop 210 responds to the output of AND gate 28, to force the advance acknowledge output signal $\overline{AC2}$ of the D flip-flop to rise to a high level, corresponding to an inhibit condition, during idle periods of memory 2. The idle periods of memory 2 are indicated by output signal $\overline{TR}$ of memory controller 5 being at a low level or during initialization of the memory module, as indicated by signal $\overline{RZT}$ being at a low level.

The manner in which advance acknowledgment signal $\overline{AC2}$ is derived at the Q output of D flip-flop 210 is a function of the following three conditions:

1. Memory 2 is available to receive data from microprocessor 1 when the processing module associated with microprocessor 1 derives a request for access to memory 2, indicated by derivation of transfer request signal $\overline{AS}$, and when memory 2 is allocated to the processing module including microprocessor 1 by the selector circuit included in controller 5. In this condition, controller 5 derives output signals $\overline{TR}$ and $\overline{RZT}$ as binary one levels, and derives signal CYCLE as a binary zero level. In response to microprocessor 1 deriving transfer request signal $\overline{AS}$ under these conditions, D flip-flop 210 is activated to cause the level of the $\overline{AC2}$ output of the D flip-flop to fall to a low, active level; these operations are illustrated in FIG. 3 by the waveforms designated as $\overline{AS}$ and $\overline{AC2}$. In response to the Q output signal of D flip-flop 210 being in the low, active state, NAND gate 212 derives internal acknowledgment signal $\overline{AC3}$ in response to the memory controller deriving signal MTCYCLE; signal MTCYCLE indicates that memory 2 is allocated to the processing module including microprocessor 1. When the data transfer between microprocessor 1 and memory 2 by way of bus BD has been completed, the microprocessor stops deriving signal $\overline{AS}$; memory controller 5 responds to deactivation of signal $\overline{AS}$ by deactivating signal MTCYCLE, which in turn causes NAND gate 212 to stop deriving interval acknowledgment signal $\overline{AC3}$. Memory 2 then enters an idle phase. During the idle phase, memory controller 5 derives signal $\overline{TR}$ which is coupled through AND gate 28 to the set input S of D flip-flop 210, to inhibit further derivation of advance acknowledgment signal $\overline{AC2}$ at the Q output of the flip-flop.

2. The second condition assumes that memory 2 is available when (a) the processing module including microprocessor 1 requests access to the memory by deriving transfer request signal $\overline{AS}$ and (b) memory 2 is allocated to a device other than the processing module including microprocessor 1 by the selector of controller 5, e.g. the selector of controller 5 has allocated memory 2 to one of the devices connected to external bus BEXT. Under these conditions, when signal $\overline{AS}$ is derived by microprocessor 1, the conditions described in the foregoing paragraph are restored, causing signal $\overline{AC2}$ to be derived at the output of D flip-flop 210. Conversely, signal MTCYCLE is not derived during the cycle in progress because memory 2 is not working for and is not responsive to data from the processing module including microprocessor 1. Instead, under these conditions a data transfer is assumed to be occurring between memory 2 and another microprocessor or an output device connected to bus BEXT. When the transfer between memory 2 and the other microprocessor or output device has been completed, memory controller 5 derives signal $\overline{TR}$ which is coupled to the set input of flip-flop 210 by way of AND gate 28; the resulting output of gate 28 prevents signal $\overline{AC2}$ from being derived at output Q of D flip-flop 210. When memory controller 5 allocates memory 2 to the processing module including microprocessor 1, signal $\overline{AC1}$ is derived by the memory controller and coupled through NAND gate 212 in response to derivation of signal MTCYCLE by controller 5. The waveforms associated with derivation of signal $\overline{AC1}$ for this set of circumstances are illustrated in FIG. 3.

3. The third condition assumes that memory 2 is unavailable when the processing module including microprocessor 1 requests access by deriving transfer request signal $\overline{AS}$. Under these conditions, if signal $\overline{TR}$ is derived by memory controller 5 to indicate that memory 5 is in an idle phase, the set input of flip-flop 210 is controlled to cause the flip-flop output signal $\overline{AC2}$ to rise to a high level that indicates memory 2 cannot be accessed. If, however, the memory module was idle previously and signal $\overline{TR}$ was not being derived, signal CYCLE is conversely derived by the memory controller because memory 2 is busy when signal $\overline{AS}$ is derived; this prevents derivation of the $\overline{AC2}$ output signal by D flip-flop 210. When memory 2 is allocated to the processing module including microprocessor 1, as occurs when memory controller 5 derives signal MTCYCLE, signal $\overline{AC1}$ is derived to the exclusion of signal $\overline{AC2}$. Signal $\overline{AC1}$ is coupled through gates 211 and 212 and enables derivation of signal $\overline{AC3}$ in response to signal MTCYCLE being derived by controller 5.

Figure 4:
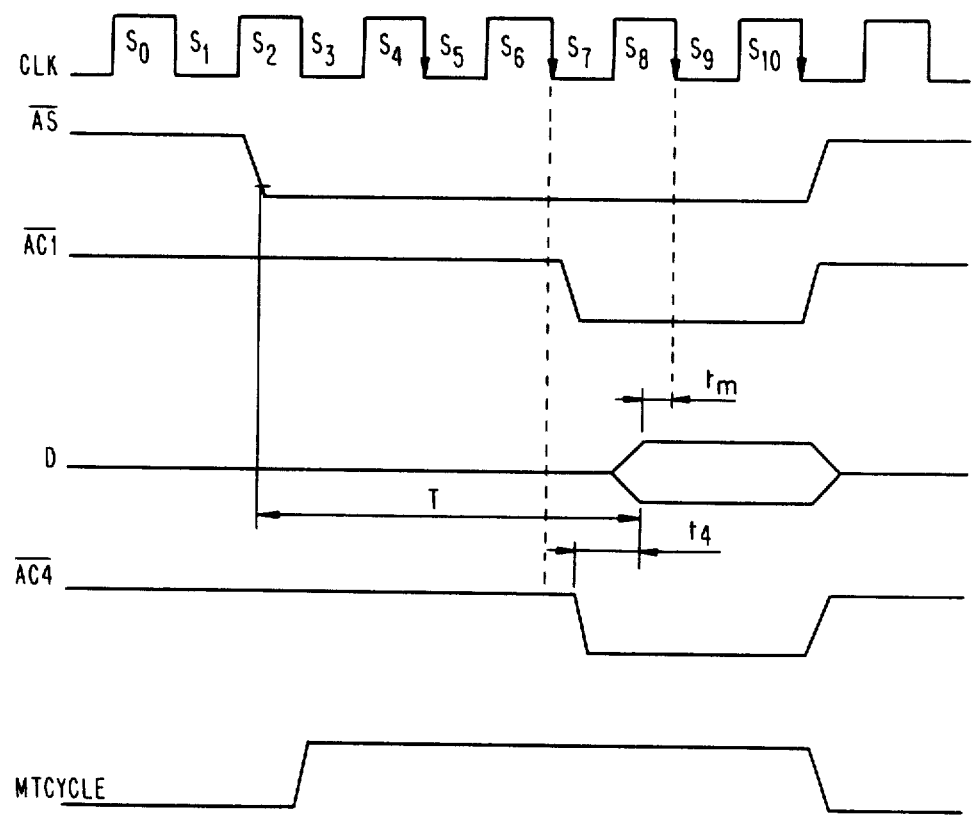
FIG. 4 is a series of waveforms indicating the nature of the signals derived by the apparatus of FIGS. 1 and 2 when the method of the invention is not being performed during a read cycle.

The operation of the apparatus illustrated in FIGS. 1 and 2 during a read cycle of memory 2 is represented in FIG. 4 for the following conditions: (a) memory 2 is available when signal $\overline{AS}$ is derived by microprocessor 1, (b) memory 2 is allocated to the processing module including microprocessor 1 by the selector included in controller 5, and (c) the method of the invention is not performed. From FIG. 4, it is apparent that the data could have been read out of memory 2 to microprocessor 1 by way of data bus BDM in response to the trailing edge of pulse S8 in the CLK output signal of clock source 3. (The time data are on bus BDM is indicated by waveform D, FIG. 4). Such data read-out could have occurred because acknowledgment signal $\overline{AC4}$ was supplied to and stored in microprocessor 1 while the previous trailing edge, S7, of signal CLK was being derived. With conventional operation, this is not possible because microprocessor 1 can recognize that signal $\overline{AC4}$ has been derived only during the trailing edge of clock pulse S8. Consequently, the data read out of memory 2 can be received by and stored in a buffer of microprocessor 1 only while the trailing edge of pulse S10 is being derived. Thus, in the prior art there is a waiting cycle or period equal to the duration of two pulses of signal CLK between the time relative to data are supplied to the output of memory 2 and the time when microprocessor 1 can respond to and store that data.

In FIG. 3 are illustrated the waveforms of signals transferred between the processing and memory modules during a memory read cycle during which the method of the invention is performed. In FIG. 3 it is assumed that memory 2 is available to be accessed when signal $\overline{AS}$ is derived from microprocessor 1 and that the memory is allocated to the processing module including microprocessor 1 by the selector of memory controller 5. Further, it is assumed in the FIG. 3 example that signal $\overline{AS}$ is derived in the interval between the leading and trailing edges of pulse S2 of signal CLK. Thus, the waveforms illustrated in FIG. 3 correspond to case 1, considered supra.

As previously described, signal $\overline{AC3}$ is derived by circuit 7 while controller 5 is deriving signal MTCY-CLE and D flip-flop 210 is deriving signal $\overline{AC2}$. During the time that signal $\overline{AC3}$ is derived, the mask window output signal F derived from array 4 enables NAND gate 14 to cause derivation of signal $\overline{AC4}$. Signal $\overline{AC4}$ is derived with a slight delay relative to the derivation time of signal F due to the propagation time of NAND gate 14, as an inspection of the waveforms designated F and $\overline{AC4}$ in FIG. 3 reveals. As illustrated in FIG. 3 the leading edge of signal F occurs simultaneously with the leading edge of pulse S6 n signal CLK, i.e., simultaneously with the leading edge of the second clock pulse which occurs after signal $\overline{AS}$ is derived.

The delay between the derivation of signal $\overline{AS}$ and the leading edge of signal F is programmed in logic array 4 as a function of time T. Time T is the interval between the derivation of request signal $\overline{AS}$ by microprocessor 1 and the coupling of data signals read from memory 2 back to the microprocessor by way of data bus BD. Programming logic array 4 is arranged so that processing module acknowledgment signal $\overline{AC4}$ is coupled to and stored in a buffer of processing unit 1 simultaneously with derivation of the trailing edge of pulse S6 in signal CLK; the trailing edge of pulse S6 precedes the trailing edge of clock pulse S8 of signal CLK. During the trailing edge of clock pulse S8 data on bus BD are supplied to and stored in microprocessor 1, as indicated by the hexagon on the D (data) waveform of FIG. 3.

The delay programmed in logic array 4 may be modified as necessary to enable the data on bus BD to be read simultaneously with the derivation of the first trailing edge which occurs after read-out of the data from memory 2. At the end of a clock pulse cycle when microprocessor 1 is no longer deriving signal $\overline{AS}$, signal $\overline{AC4}$ is no longer derived at the output of NAND gate 14. However window signal F is maintained for another clock pulse cycle of signal CLK before it is terminated. In FIG. 3 this operation is illustrated by (1) the positive going portion of waveform $\overline{AS}$ subsequent to the trailing edge of pulse S8, (2) the positive going edge of signal $\overline{AC4}$ after the trailing edge of pulse S8, and (3) the negative going edge of signal F subsequent to the trailing edge of pulse S10.

In FIG. 4 are illustrated acknowledgment signals $\overline{AC1}$ and $\overline{AC4}$ which are normally produced by memory controller 5 in response to microprocessor 1 deriving transfer request signal $\overline{AS}$ and coupling it to the memory controller. In FIG. signal $\overline{AS}$ is derived during the interval between the leading and trailing edges of clock pulse S2, while the negative going leading edges of signals $\overline{AC1}$ and $\overline{AC4}$ are derived during the interval between the trailing, negative going edge of pulse S6 and the leading, positive going edge of pulse S8 in signal CLK. Signals $\overline{AC1}$ and $\overline{AC4}$ are no longer derived, i.e., are inhibited, during the interval immediately after the trailing, negative going edge of pulse S10 of clock signal CLK. Memory 2 responds to signals coupled to it to read data out during the interval between clock pulses S8 and S10, as indicated by the hexagon in waveform D, FIG. 4. From waveforms $\overline{AS}$ and D, FIG. 4, it is seen that memory 2 requires a time interval T to deliver the data stored therein to buses BDM and BD after derivation of the address enabling or transfer request signal $\overline{AS}$. When there is no synchronism between the operation of memory 2 and the output signal CLK of the microprocessor clock source 3, the acknowledgment signal $\overline{AC4}$ must be delivered to the microprocessor at least 65 nanoseconds before the data on bus BD are coupled to the microprocessor; in FIG. 4 this interval between the coupling of acknowledgment signal AC4 to the microprocessor and receipt by the microprocessor of data on bus BD is indicated by the interval $t_4$. This 65 nanosecond delay time between the receipt of the acknowledgment signal $\overline{AC4}$ and the data by the microprocessor is an inherent characteristic of the microprocessor internal operation and represents the time required for the microprocessor to receive and store the signal in a buffer. In addition, to enable microprocessor 1 to recognize acknowledgment signal $\overline{AC4}$, the acknowledgment signal must be supplied to the microprocessor no sooner than 20 nanoseconds before the trailing edge of a clock pulse in signal CLK. In order for the data on bus BD to be read by microprocessor 1, the data must be supplied to the microprocessor at least 15 nanoseconds before the trailing edge of a clock pulse in signal CLK; the 15 nanosecond interval is indicated on FIG. 4 by time $t_m$. The 15, 20 and 65 nanosecond intervals are the times required for microprocessor 1 to change internal states to receive and store the indicated signals.

Because of these constraints in microprocessor 1, under most operating conditions an additional waiting cycle, commensurate with the interval between the trailing edges of adjacent even-numbered clock pulses, is introduced by the prior art. In FIG. 4 is illustrated the unfavorable situation wherein acknowledgment signal $\overline{AC1}$ cannot be propagated to microprocessor 1 as acknowledgment signal $\overline{AC4}$ in sufficient time relative to the derivation of the trailing edge of clock pulse S6. Consequently, microprocessor 1 responds to acknowledgment signal $\overline{AC1}$ in response to the next clock pulse trailing edge S8. Thereby, the data read out of memory 2 can be supplied to microprocessor only in response to the next clock pulse trailing edge S10. Hence, the data maintenance time and the read cycle time are extended by one microprocessor clock cycle relative to the operation illustrated in FIG. 3.

Figure 5:
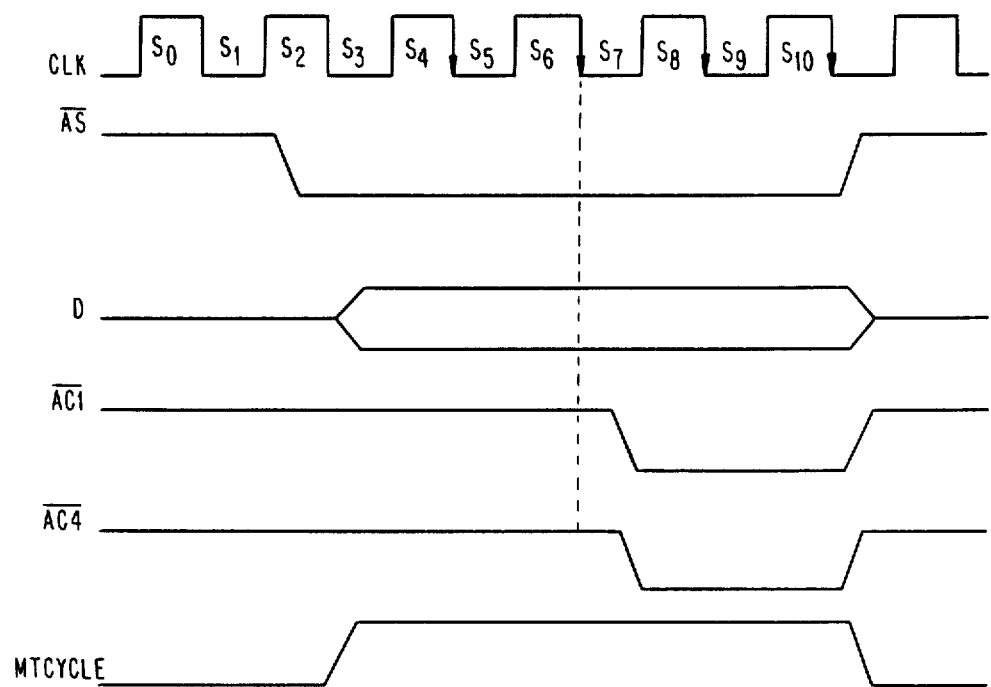
FIG. 5 is a series of waveforms representing the signals which are derived by the apparatus of FIGS. 1 and 2 when the method of the invention is not being performed during a write cycle.

Reference is now made to FIG. 5 of the drawing wherein there are illustrated waveforms which are derived by the system of FIGS. 1 and 2 for writing data from microprocessor 1 into memory 2 by way of data buses BD and BDM in response to the microprocessor deriving a transfer request signal $\overline{AS}$. In the example considered in connection with FIG. 5, memory 2 is allocated to microprocessor 1 of the processing module, but the method of the invention is not performed; this is in contrast to the read cycle discussed in connection with FIG. 4.

During a write cycle, memory controller 5 derives an acknowledgment signal $\overline{AC1}$ having waveform characteristics taking into account the minimum reaction time of microprocessor 1; the minimum reaction time of microprocessor 1 is the minimum time between the reception by the microprocessor of two adjacent signals, such as acknowledgment signal $\overline{AC4}$ and signal CLK that the microprocessor can supply a data word to bus BD. In the example illustrated in FIG. 5, memory controller 5 derives acknowledgment signal $\overline{AC1}$ while clock pulse S7 is being derived. Circuit 7 responds to signal $\overline{AC1}$ to derive signal $\overline{AC4}$ during clock pulse S7, but in slightly delayed relationship to the edges of signal $\overline{AC1}$. In the example illustrated in FIG. 5, signal $\overline{AC1}$ is generated asynchronously with the edges of signal CLK. Signal AC4, at the output of NAND gate 14, is initially sampled by microprocessor 1, in the example of FIG. 5, during the trailing edge of pulse S4 of signal CLK. To be sure that signal $\overline{AC4}$ is supplied to and captured by microprocessor 1, it is necessary to have a 20 nanosecond delay between the trailing edges of the even-numbered pulses of signal CLK and the derivation of acknowledgment signal $\overline{AC4}$. However, it is possible that microprocessor 1 will recognize the leading edge, negative going transition of signal $\overline{AC4}$ even though there is less than a 20 nanosecond delay time between a negative going trailing edge of a positive pulse of signal CLK and the leading, negative going edge of signal $\overline{AC4}$. A Motorola 68010 microprocessor must be enabled only at least 20 nanoseconds after the occurrence of the trailing edge of positive pulses of signal CLK to be certain that the acknowledgment signal $\overline{AC4}$ is not captured by the microprocessor as a trailing edge of signal CLK is being derived. In addition, the Motorola 68010 microprocessor is likely to inhibit reception of acknowledgment signal $\overline{AC4}$ immediately after a transfer indicated by signal $\overline{AS}$, i.e., along a trailing edge of signal CLK. Thus, the minimum reaction time of a Motorola 68010 microprocessor operating at 10 MHz can be estimated as 80 nanoseconds by analyzing the logic associated with the microprocessor.

Memory controller 5 thus generates signal $\overline{AC1}$ in such a way as to allow memory 2 to complete a write cycle if microprocessor 1 reacts within the minimum time. Signal $\overline{AC4}$ is therefore a mirror image of signal $\overline{AC1}$ each time the operation of memory 2 is potentially unsynchronized relative to clock signal CLK, as occurs when the memory is not immediately available for the processing module including microprocessor 1 at the time signal $\overline{AS}$ is derived.

Reference is now made to FIG. 5 of the drawing wherein waveforms are illustrated to indicate how the system of FIG. 1 operates if a transfer requires two clock pulse cycles of signal CLK. While it is possible to conceive of a memory having a transfer within a single operating cycle of signal CLK, the indicated constraint with respect to the timing of $\overline{AC1}$ makes it likely that signal $\overline{AC1}$ will not be recognized as having been derived in time by the microprocessor if the minimum response time between coupling of the $\overline{AC4}$ signal to the microprocessor and storing it in the microprocessor is not observed. To enable microprocessor 1 to respond to such data read out of memory 2, the previously described method is again executed. The signals derived by the system, except for data read out are identical to those described in connection with FIG. 3. It is quite possible that memory 2 will require different numbers of waiting cycles of clock CLK for data read out relative to data write in. It is sufficient to supply logic array 4 with an output signal derived by microprocessor 1 which indicates whether memory 2 is to execute a read cycle or a write cycle and to arrange the logic in array 4 to program the mask signal in response to such an output signal of microprocessor 1.

Figure 9:
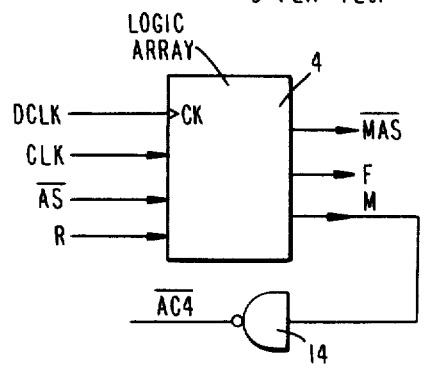
FIG. 9 is a circuit diagram of a programmable logic array utilized in the system of FIG. 1 to decrease the number of clock waiting cycles.

It is now assumed that two clock cycles of signal CLK are required to read data out of memory 2 and that only one cycle of signal CLK is required to write data into the memory. In such an instance, microprocessor 1 derives an output signal R (not shown in FIG. 1) having zero and one levels indicating whether data are to be read out of or written into memory 2. In such a situation, the CLK, DCLK, $\overline{AS}$ and R signals derived by the microprocessor and clock are combined in logic network 4 to generate a mask signal M in accordance with the following Boolean expression:

$$M = [(R)\cdot(F) + (R)\cdot(M\overline{AS})]\cdot\overline{CLK} + M\cdot(AS)\cdot(CLK),$$

where F and MAS are indicated supra in connection with the description of FIG. 1. Signals M, F and $\overline{MAS}$ are stored in flip-flops included in logic array 4, which is schematically illustrated in FIG. 9. The values of M, F and $\overline{AS}$ stored in the flip-flops are coupled back to the logic array circuit and combined with the DCLK, CLK, $\overline{AS}$ and R inputs of the logic array to derive the values of M, F and $\overline{MAS}$. Hence, sequential outputs of logic array are used to generate the mask signal in accordance with the above equation. The M output signal of logic array 4 is coupled to one input of NAND gate 14, having further inputs responsive to the outputs of inverters 13 and 15, as illustrated in FIG. 1.

In the assumed example discussed in connection with FIG. 9 and the equation for the value of signal M, it is assumed that two cycles of signal CLK are required to read data from memory 1 and one clock cycle is required to write data into the memory. If a greater number of clock cycles of signal CLK were necessary, a waiting cycle clock could be provided and the sequential outputs of the logic array could be combined to provide the mask signal equation as necessary.

Reference is now made to the waveforms of FIG. 6 which represent signals derived by the system of FIG. 1 when it includes a processing module and a memory module with a dynamic memory; both the processing and memory modules operate with anticipatory staging. In a system including dynamic memory modules, several memory modules are provided, each having its own module address, and addresses within the module.

Each of the memory modules includes a register for the module address and a comparator circuit responsive to such a register and the signal on address bus BA. In response to a particular memory module having a register storing a signal that is the same as the signal derived by microprocessor 1 on address bus BA, while the microprocessor is deriving high order data enabling signal $\overline{UDS}$, the memory controller 5 of such a module derives signal $\overline{AC2}$.

To access one of the modules in such an arrangement, microprocessor 1 derives a low order enabling signal $\overline{LDS}$ simultaneously with an address on address bus BA; the signal derived on the address bus at this time is stored in a buffer of a memory controller or in a buffer associated with each of the modules. Then, microprocessor 1 derives a high order data enabling signal $\overline{UDS}$, simultaneously with an address signal on bus BA; the signal on the address bus derived at this time indicates which of the several modules is to be selected. The address in the selected module is then accessed in response to the signal supplied by microprocessor 1 to address bus BA while signal $\overline{LDS}$ was being derived.

The method of the invention is particularly advantageous with dynamic memories having anticipatory stages if all addresses for the memory are not simultaneously derived by the processing module. This is often the case when a typical memory control unit is provided in the memory module. The lowest order address bits derived by microprocessor 1 which do not affect the data transfer process can be used by the dynamic memory when signal $\overline{AS}$ is derived; such low order bits do not affect the physical address of the memory, even though they are in the memory address signal derived by the microprocessor. In response to signal $\overline{AS}$ being derived, the memory modules immediately available to transfer data with the processing unit including microprocessor 1 initiate a read or write cycle by storing a line address; in this case, signal $\overline{RAS}$ is derived by the memories. The immediately available memory module is then waits to determine whether there are involved in the data transfer before continuing the read or write transfer cycle.

Then, microprocessor 1 derives a second enabling signal which causes the highest order address bits of memory 2 to be supplied by the microprocessor to address bus BA. This causes the memory module having the same address as the high order bits to be selected and enables that module to self-decode and exchange data signals with microprocessor 1. While the data exchange between the selected memory module is occurring, the other memory modules are refreshed in a conventional manner.

In FIG. 6 is illustrated the operations performed by the system of FIG. 1 during a read cycle of a memory module involved in a data transfer from the selected memory module to microprocessor 1. Under the assumed conditions, the selected module was available to the processing module including microprocessor 1 at the time signal $\overline{AS}$ was derived, give or take selection time. Signal $\overline{MAS}$, at the output of logic array 4, is supplied to memory controller 5 to enable the high order address bits on address bus BA to be coupled to memory address bus BAM at the time microprocessor 1 derives high order data enabling signal $\overline{UDS}$. In the example illustrated in FIG. 6, signal $\overline{MAS}$ is synchronous with the positive going leading edge of clock pulse S4 of signal CLK. The remaining operations performed by the selected module are identical to those described supra in connection with FIG. 3.

Figure 7:
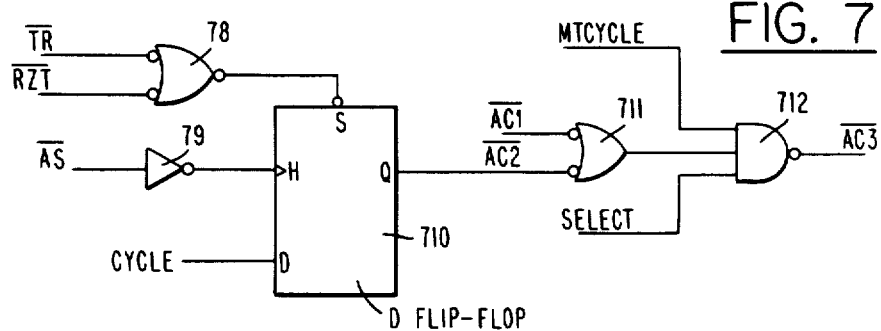
FIG. 7 is a schematic diagram of an acknowledgment signal generating circuit used in the system of FIG. 1 with a dynamic memory operating with anticipatory staging.

A circuit for generating acknowledgment signal $\overline{AC3}$ for a system with a memory having anticipatory staging is illustrated in FIG. 7. (In FIGS. 2, 7 and 8, the most significant digit of a reference numeral corresponds to the figure number and the following lower significant digits correspond to identical items; thus, reference numerals 28, 78 and 88 designate the same AND gate in FIGS. 2, 7 and 8, respectively.) The only difference between the circuits of FIGS. 2 and 7 is that signal $\overline{AC3}$ is generated in the circuit of FIG. 7 only if the memory module with which the particular circuit has self-decoded, i.e., detected that the signal stored in a register thereof is the same as the signal derived by microprocessor 1 on address bus BA at the time the microprocessor derives high order data enabling signal $\overline{UDS}$. If the memory module has self-decoded, the memory controller of the particular memory module derives signal SELECT.

Signal SELECT is supplied as one input to three input NAND gate 712. Signal SELECT is necessary in this instance because in dynamic memories having anticipatory staging, signal MTCYCLE only responds to signal $\overline{AS}$. Conversely, when the dynamic memory module does not have anticipatory cycles, the memory read and write cycles are initiated in response to derivation of signal MTCYCLE only if the module has self-decoded; in the latter case, signal MTCYCLE responds to signal SELECT.

The method of the present invention can also be applied to a system including a static read-write memory or to a system including a read-only memory. In this case, the memories employ only the signal which enables all of the memory address lines. The operation is similar to that of a dynamic memory operating without anticipatory staging.

Figure 8:
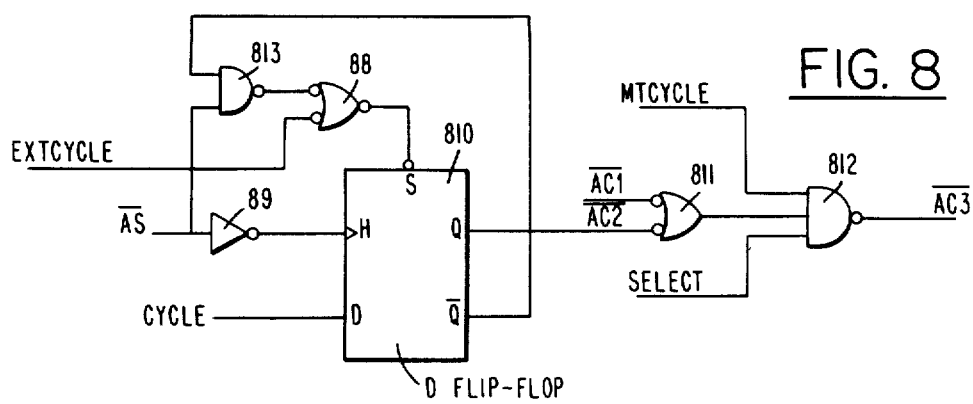
FIG. 8 is a schematic diagram of an acknowledgment signal generating circuit used in the system of FIG. 1 with a read-only memory or a static read-write memory.

A circuit which can be employed in a memory module including a static read-write memory or a read-only memory to derive signal $\overline{AC3}$ is illustrated in FIG. 8. In FIG. 8, NAND gate 812 is responsive to signal SELECT, which is derived by the memory controller connected to the circuit of FIG. 8 in the same manner as described in connection with FIG. 7. When signal SELECT is derived, the memory module with which the circuit of FIG. 8 is associated has self-decoded. Signal $\overline{AC3}$ is thus derived at the output of NAND gate 812 in a manner similar to that described in connection with FIGS. 2 and 7 in response to the signal variations at the Q output of flip-flop 810.

In the circuit of FIG. 8, the $\overline{Q}$ output of flip-flop 810, which represents the complement of the advance acknowledgment signal $\overline{AC2}$, is combined in NAND gate 813 with transfer request signal $\overline{AS}$ derived by microprocessor 1. The output of NAND gate 813 is combined in AND gate 88 with signal EXTCYCLE derived by memory controller 5 to indicate that memory 2 of the memory module associated with the memory controller is performing a read or write operation at an address indicated on external bus BEXT. The output of AND gate 88 is coupled to the set input of flip-flop 810 in the same manner that the outputs of AND gates 28 and 78 are respectively coupled to the set inputs of flip-flops 210 and 710. All other connections in the circuit illustrated in FIG. 8 are identical to those illustrated in FIGS. 2 and 7.

While there have been described and illustrated several specific embodiments of the invention, it will be clear that variations in the details of the embodiments specifically illustrated and described may be made without departing from the true spirit and scope of the invention as defined in the appended claims.

I claim:

1. Apparatus for asynchronously transferring data between a microprocessor module and a memory module, the microprocessor module comprising:

a microprocessor, a clock source, a logic array and a gate, the logic array being responsive to the clock signal source and a transfer command signal for deriving a mask window signal, F, having a duration equal to a transfer time between the memory and microprocessor modules, said transfer time being equal to one waiting cycle of said memory for commands form said microprocessor, the mask window signal, F, being derived by the logic array in accordance with $$F = (MAS)\overline{(CLK)} + \overline{F(AS)(CLK)}$$

where $MAS = (AS)(CLK) + (MAS)\overline{(AS)(CLK)}$

CLK = the state of the clock signal derived by the clock source and applied to the microprocessor, and AS = the state of the transfer command signal;

the microprocessor including an output terminal on which is derived a signal commanding transfer of data between the memory and microprocessor modules and an input terminal for enabling data and address terminals of the microprocessors to be selectively coupled to address and data buses coupled to the memory module while an acknowledge signal is applied thereto;

the memory module comprising a memory, a memory controller, an internal acknowledge signal generator responsive to signals from the memory controller and the transfer command signal for deriving an advance acknowledge signal in synchronism with derivation of the transfer command signal in response to signals form the memory controller indicating unused space in the memory is allocated to said microprocessor, the internal acknowledge signal generator also being responsive to first and second signals from the memory controller, the first signal being derived by the memory controller in response to the microprocessor to indicate whether the memory is and is not available at the time the transfer control signal is derived, the second signal indicating whether or not the memory is reading or writing a data signal of said microprocessor, the internal acknowledge signal generator selectively deriving an internal acknowledge signal (1) while the second signal is derived and while the first signal is derived, and (2) while the advance acknowledge signal is generated;

the gate being responsive to the transfer command signal, the internal acknowledge signal and the mask window signal for supplying the acknowledge signal to the microprocessor input terminal to control coupling of the address and data buses to the address and data terminals of the microprocessor.

2. Apparatus for asynchronously transferring data between a microprocessor module and a memory module, the microprocessor module comprising:

a microprocessor, a clock source, a logic array and a gate, the logic logic array being responsive to the clock signal source and a transfer command signal for deriving a mask window signal having a duration equal to a transfer time between the memory and microprocessor modules, said transfer time being equal to one waiting cycle of said memory for commands from said microprocessor, the microprocessor including an output terminal on which is derived a signal commanding transfer of data between the memory and microprocessor modules and an input terminal for enabling data and address terminals of the microprocessor to be selectively coupled to address and data buses coupled to the memory module while an acknowledge signal is applied thereto;

the memory module comprising a memory, a memory controller, an internal acknowledge signal generator responsive to signals from the memory controller and the transfer command signal for deriving an advance acknowledge signal in synchronism with derivation of the transfer command signal in response to signals from the memory controller indicating unused space in the memory is allocated to said microprocessor, the internal acknowledge signal generator also being responsive to first and second signals from the memory controller, the first signal being derived by the memory controller in response to the microprocessor to indicate whether the memory is and is not available at the time the transfer control signal is derived, the second signal indicating whether or not the memory is reading or writing a data signal of said microprocessor, the internal acknowledge signal generator selectively deriving an internal acknowledge signal (1) while the second signal is derived and while the first signal is derived, and (2) while the advance acknowledge signal is generated;

the internal acknowledge signal generator including a D flip-flop for deriving the advance acknowledge signal, said flip-flop having set, clock and D input terminals respectively responsive to a signal derived from the memory controller, the state of the transfer control signal and a signal derived from the memory controller indicating that the memory is performing a read or write operation;

the gate being responsive to the transfer command signal, the internal acknowledge signal and the mask window signal for supplying the acknowledge signal to the microprocessor input terminal to control coupling of the address and data buses to the address and data terminals of the microprocessor.

3. The apparatus of claim 2 wherein the set input terminal is responsive to a signal indicative of $\overline{TR + RZT}$ where $\overline{TR}$ is the binary value of a signal derived from the memory controller indicative of the memory module being in an idle period, and $\overline{RZT}$ is the binary value of a signal indicative of the memory being initialized.

4. The apparatus of claim 3 wherein the means for deriving the mask window signal derives the mask window signal, F, in accordance with $$F = (MAS)\,(\overline{CLK}) + \overline{F(\overline{AS})(CLK)}$$

where
$MAS = (AS)(CLK) + (MAS)\overline{(\overline{AS})(CLK)}$

CLK = the state of a clock signal derived by the clock source and applied to the microprocessor, and AS = the state of the transfer command signal.

5. Apparatus for asynchronously transferring data between a microprocessor module and a memory module, the microprocessor module comprising:

a microprocessor, a clock source, a logic array and a gate, the logic array being responsive to the clock signal source and a transfer command signal for deriving a mask window signal having a duration equal to a transfer time between the memory and microprocessor modules, said transfer time being equal to one waiting cycle of said memory for commands from said microprocessor, the microprocessor including an output terminal on which is derived a signal commanding transfer of data between the memory and microprocessor modules and an input terminal for enabling data and address terminals of the microprocessor to be selectively coupled to address and data buses coupled to the memory module while an acknowledge signal is applied thereto;

the memory module comprising a memory, a memory controller, an internal acknowledge signal generator responsive to signals from the memory controller and the transfer command signal for deriving an advance acknowledge signal in synchronism with derivation of the transfer command signal in response to signals from the memory controller indicating unused space in the memory is allocated to said microprocessor, the internal acknowledge signal generator also being responsive to first and second signals from the memory controller, the first signal being derived by the memory controller in response to the microprocessor to indicate whether the memory is and is not available at the time the transfer control signal is derived, the second signal indicating whether or not the memory is reading or writing a data signal of said microprocessor, the internal acknowledge signal generator selectively deriving an internal acknowledge signal (1) while the second signal is derived and while the first signal is derived, and (2) while the advance acknowledge signal is generated;

the memory having anticipatory staging and the internal acknowledge signal generator including means for logically combining the advance acknowledge signal and the first and second signals from the memory controller and a third signal from the memory controller indicating whether the memory has been read, the means for logically combining deriving the internal acknowledge signal;

the gate being responsive to the transfer command signal, the internal acknowledge signal and the mask window signal for supplying the acknowledge signal to the microprocessor input terminal to control coupling of the address and data buses to the address and data terminals of the microprocessor.

6. The apparatus of claim 5 wherein the means for deriving the mask window signal derives the mask window signal, F, in accordance with $$F = (MAS)\overline{(CLK)} + \overline{F(AS)(CLK)}$$

where $MAS = (AS)(CLK) + (MAS)\overline{(AS)(CLK)}$

CLK = the state of a clock signal derived by the clock source and applied to the microprocessor, and AS = the state of the transfer command signal.

7. The apparatus of claim 5 wherein the internal acknowledge signal generator includes a D flip-flop for deriving the advance acknowledge signal, said flip-flop having set, clock and D input terminals respectively responsive to a signal derived from the memory controller, the state of the transfer control signal and a signal derived from the memory controller indicating that the memory is performing a read or write operation.

8. The apparatus of claim 7 wherein the set input terminal is responsive to a signal indicative of $\overline{TR} + \overline{RZT}$ where $\overline{TR}$ is the binary value of a signal derived from the memory controller indicative of the memory module being in an idle period, and $\overline{RZT}$ is the binary value of a signal indicative of the memory being initiallized.

9. The apparatus of claim 8 wherein the means for deriving the mask window signal derives the mask window signal, F, in accordance with $$F = (MAS)\overline{(CLK)} + \overline{F(AS)(CLK)}$$

where $MAS = (AS)(CLK) + (MAS)\overline{(AS)(CLK)}$

CLK = the state of a clock signal derived by the clock source and applied to the microprocessor, and AS = the state of the transfer command signal.

10. The apparatus of claim 8 wherein the set input is responsive to a further signal derived by said memory controller and indicating that said memory is performing a read or write operation for a device other than said microprocessor.

11. The apparatus of claim 10 wherein the means for deriving the mask window signal derives the mask window signal, F, in accordance with $$F = (MAS)\overline{(CLK)} + \overline{F(AS)(CLK)}$$

where $MAS = (AS)(CLK) + (MAS)\overline{(AS)(CLK)}$

CLK = the state of a clock signal derived by the clock source and applied to the microprocessor, and AS = the state of the transfer command signal.

12. Apparatus for asynchronously transferring data between a microprocessor module and a memory module including a read only memory or a static read/write memory, the microprocessor module comprising:

a microprocessor, a clock source, a logic array and a gate, the logic array being responsive to the clock signal source and a transfer command signal for deriving a mask window having a duration equal to a transfer time between the memory and microprocessor modules, said transfer time being equal to one waiting cycle of said memory for commands from said microprocessor, the microprocessor including an output terminal on which is derived a signal commanding transfer of data between the memory and microprocessor modules and an input terminal for enabling data and address terminals of the microprocessor to be selectively coupled to address and data buses coupled to the memory module while an acknowledge signal is applied thereto;

the memory module comprising a memory, a memory controller, an internal acknowledge signal generator responsive to signals from the memory controller and the transfer command signal for deriving an advance acknowledge signal in synchronism with derivation of the transfer command signal in response to signals from the memory controller indicating unused space in the memory is allocated to said microprocessor, the internal acknowledge signal generator also being responsive to first and second signals from the memory controller, the first signal being derived by the memory controller in response to the microprocessor to indicate whether the memory is and is not available at the same time the transfer control signal is derived, the second signal indicating whether or not the memory is reading or writing a data signal of said microprocessor, the internal acknowledge signal generator selectively deriving an internal acknowledge signal (1) while the second signal is derived and while the first signal is derived, and (2) while the advance acknowledge signal is generated;

the internal acknowledge signal generator including means for logically combining the advance acknowledge signal and the first and second signals from the memory controller and a third signal from the memory controller indicating whether the memory has been read, the means for logically combining deriving the internal acknowledge signal;

the gate being responsive to the transfer command signal, the internal acknowledge signal and the mask window signal for supplying the acknowledge signal to the microprocessor input terminal to control coupling of the address and data buses to the address and data terminals of the microprocessor.

13. The apparatus of claim 12 wherein the means for deriving the mask window signal derives the mask window signal, F, in accordance with $$F = (MAS)(\overline{CLK}) + \overline{F(AS)(CLK)}$$

where
$$MAS = (AS)(CLK) + (MAS\overline{(AS)(CLK)})$$

CLK = the state of a clock signal derived by the clock source and applied to the microprocessor, and AS = the state of the transfer command signal.

14. The apparatus of claim 12 wherein the internal acknowledge signal generator includes a D flip-flop for deriving the advance acknowledge signal, said flip-flop having set, clock and D input terminals respectively responsive to a signal resulting from a logical combination of the transfer control signal and an indication of the flip-flop state, the state of the transfer control signal and signal derived from the memory controller indicating that the memory is performing a read or write operation.

* * * * *